United States Patent Office 3,789,003
Patented Jan. 29, 1974

3,789,003
SOLUBILIZING PROCESS
Frederic C. McCoy, Beacon, N.Y., assignor to
Texaco Inc., New York, N.Y.
No Drawing. Continuation-in-part of application Ser. No. 787,567, Dec. 27, 1968. This application Aug. 25, 1971, Ser. No. 174,943
Int. Cl. C10m 1/28
U.S. Cl. 252—42.7                    8 Claims

ABSTRACT OF THE DISCLOSURE

This invention concerns a process for converting normally oil-insoluble, high molecular weight poly (alkylene) oxides to oil-solubilized complexes by treatment with alkylated phenol-type compounds.

This invention is a continuation-in-part of copending Ser. No. 787,567, filed December 27, 1968 in the U.S. Patent Office.

BACKGROUND OF THE INVENTION

This invention concerns a process for solubilizing oxygen-containing hydrocarbon polymers.

More particularly, this invention concerns the solubilization of high molecular weight poly (alkylene) oxides normally insoluble in mineral oil as well as the resultant compositions produced therein.

The improvement of mineral oils derived from petroleum refining, particularly for applications involving automatic additives, is often desirable. Frequently the addition of additives within relatively small concentration ranges produces highly desirable changes or modifications in the mineral oil's properties. For example, many low molecular weight polymeric alkoxylated fatty acids, fatty amines and/or other straight chain derivatives containing an active functional moiety have been found to be useful as surfactants among other applications, in aqueous systems. Unfortunately, while many of these low molecular weight alkoxylated materials are freely soluble in water, they are normally insoluble in mineral oils and cannot be used as additives therefor. As used herein, poor solubility in oil, particularly in paraffinic oils, is defined as not possessing sufficient solubility to permit a clear, stable 0.10% by weight solution to be prepared in a SAE20 paraffin base oil at 65° to 85° F.

In the copending "parent" case the applicant developed a process for solubilizing polymeric alkoxylated fatty substrates having a low molecular weight (less than 5,000) so that 0.10% by weight and higher solutions of said substrates could be prepared that are stable and clear at 65° F. to 85° F. in paraffin base mineral oils.

SUMMARY OF THE INVENTION

The inventive process comprised contacting the polymeric alkoxylated substrate to be solubilized with an excess of at least one alkylated phenol-type compound at about 160° F. and agitating the mixture of substrate and alkylated phenol-type compound until a substantially clear, homogeneous complex whose solubility in SAE paraffinic oil at 65° to 85° F. exceeds 0.10% by weight.

Recently the applicant discovered that high molecular weight (above 50,000) poly (alkylene oxides), which normally are even more insoluble in mineral oils and certain synthetic esters than are the polymeric fatty alkoxylated derivatives, can be solubilized using alkylated phenol type. Not only are the polymeric poly (alkylene oxides) solubilized in mineral oil but they have been found to impart substantially increased stringiness and tackiness to mineral oils, increasing their viscosity, without having any deleterious effect on the other desirable characteristics of the polymer-oil blend.

It is an object of this invention, among many others, to produce blends of mineral oil and solubilized high molecular weight poly (alkylene oxides), useful as lubricating oil additives.

A more specific object of this invention is to produce mineral oil blends of increased viscosity and tackiness without significantly affecting other desirable properties.

Additional objects include imparting increased viscosity and tackiness to diverse fluids such as raw, unbodied linseed oil, polyalkylene glycol synthetic oils and aliphatic polyol esters and the like.

Further objects are forming solubilized blends of diesel fuels or unleaded motor gasolines with high molecular weight poly (alkylene oxides), said solubilized blends being devoid of tackiness but having increased viscosity.

Other pertinent objects can be gleaned by those skilled in the art, after a further perusal of this disclosure.

In general, the inventive procedure is to contact the polymer to be solubilized (having a molecular weight of at least about 50,000) with an aromatic solvent, then adding to the dissolved aromatic solvent solution of polymer, the alkylated-phenol-type solubilizer, alone or with some of the oil in which polymer is to be dissolved, either neat or in an aromatic solution. In all instances the aromatic solvent (mostly commonly illustrated by benzene) is stripped off leaving a concentrate of polymer-solubilizer, with or without oil, which can be further diluted with the oil which is to contain the normally insoluble polymer.

The blends obtained are usually highly viscous, tacky materials useful as lubricants for specific applications such as lubricants for rock drills, oils for use in air cleaners or in other applications where excess drainage is to be avoided.

DESCRIPTION OF THE INVENTION

In order to more clearly set forth the scope of the subject invention, the following additional disclosure is submitted:

(A) Alkylated phenol-type compound.—This is the generic designation used to define the solubilizing agents of this invention. These agents are chosen from the mono- and dinuclear aromatics that contain at least one hydroxyl group and an alkylating group or groups containing a total of between 4 and 50, preferably between 8 and 20 carbon atoms, arranged in either branched chains or straight chains. Since these compounds are the solubilizing agents they must at least be miscible with those oils in which the polymers are to be solubilized. Where the alkylating moiety contains 12 carbon atoms or higher the metal phenates, particularly the alkali metal and alkaline earth metal phenates may be employed. The alkylated phenol-type "compound" can be in the form of a relatively pure discrete single compound or in the form of blends or mixtures of one or more alkylated phenols. Depending upon their physical state, solid or liquid, or the convenience of the user, the solubilizing compounds can be used with or without low-boiling aromatic solvents to assist in preparing the complexes. The low-boiling solvent is normally removed in a subsequent stripping operation.

Inasmuch as cost, convenience, availability and stability are all factors to be considered in choosing the solubilizing agents, the favored alkylated phenol-type solubilizing agents are the alkylated hydroxy mononuclear aromatics such as the alkylated phenols, cresols and the like containing from 8 to 20 carbon atoms or mixtures thereof. These solubilizing compounds are produced in tonnage quantities, are available at relatively low cost and function extremely well in solubilizing alkoxylated substrates, particularly ethoxylated substrates. These compositions, in the form of both their unresolved mixtures or relatively pure fractions or single compounds, are usually derived from the direct reaction of olefins with the hydroxy aromatic under reaction conditions already extensively described in the patent and technical literature.

Illustrative preferred solubilizing agents are the butyl phenols, the pentyl phenols, the hexyl phenols, the heptyl phenols, the octyl phenols, the nonyl phenols, the decyl phenols, the undecyl phenols, the dodecyl phenols, the tridecyl phenols as well as alkylated di- and polyhydroxylated phenols and their homologues, also diisopropyl phenols, dibutyl phenols, dioctyl phenols and dinonyl phenols. Especially preferred are the alkylated phenols in which the alkyl groups contain from 8 to 16 carbon atoms, and are branched rather than straight chain.

(B) Poly (alkylene oxide) substrates.—As indicated earlier, the prime limitations on the substrates are that they:

(1) Lack normal oil solubility in paraffinic oils to the extent that less than 0.10% by weight of the alkoxylated substrate is soluble in an SAE 20 paraffinic oil at ambient temperatures. Visual determination is used as the test in determining whether a given solution is unclear or hazy or contains a separated phase or precipitate.

(2) Have a high molecular weight ranging from 50,000 and upward to about 5,000,000. Preferably the poly (alkylene oxides) will range from 200,000 to 600,000. The poly (alkylene oxides) are well known materials and the lower poly (alkylene oxides) such as poly (ethylene oxide), poly (propylene oxides) and poly (butylene oxides) are commercial products and can be purchased in a suitable degree of purity. The higher alkylene oxides (as well as the lower poly (alkylene oxides) can be made according to methods published in the literature.

(C) Conditions required for solubilizing process.— The conditions required for the practice of the subject invention are generally not critical. The usual procedure is to dissolve the high molecular weight poly (alkylene oxide) in a mono-nuclear solvent, an alkylated mononuclear solvent or mixtures of these "aromatics." Benzene is the preferred aromatic solvent, primarily because of its low boiling point, its low cost and its efficacy. However, toluene, xylene or the like can be employed alternatively. Inasmuch as the presence of alkyl groups decreases the ease of separating the aromatic solvent, the alkylated mono-nuclear aromatics are seldom employed. While the use of aromatic solvents increases the ease of solubilizing the normally oil-insoluble polymers, where both the polymer and alkylated phenol-type solubilizers are liquids, the solubilization can, in many instances, be effected by efficient stirring and heating the components in the absence of a solvent. The time required for preparation of the solubilized poly (alkylene oxide)-alkylated phenol-type complex is variable, dependent upon the nature of the components and the process employed. Usually, when aromatic solvent is used, the time will seldom exceed one hour and, in most instances, will range from a few minutes up to about a half-hour. The temperatures needed are also not critical, usually ranging from about 70° F. up to 225° F., more usually from 90° to 175° F. The order of addition is also variable, except that when aromatic solvents are employed it is most convenient to first dissolve the polymers with the aromatic solvent and then vary the order of addition of the remaining components. Several procedures are shown below:

In one procedure a poly (alkylene oxide) having a molecular weight of at least 50,000 is dissolved in at least one mononuclear or alkylated mononuclear solvent mixture. This mixture is contacted with the alkylated phenol-type solubilizer and the resulting mixture is stripped of aromatic solvent leaving a poly (alkylene oxide)-alkylated phenol-type concentrate. This concentrate can be stored for future use or blended at this time with the oil in which the polymer is to be solubilized.

In another related procedure the poly (alkylene oxide) aromatic solution supra is contacted with an agitated solution of the alkylated phenol-type solubilizer in all or a portion of the oil in which it is to be solubilized. The solution of polymer, alkylated phenol-type solubilizer and aromatic solvent is heated to strip it of aromatic solvent and the resultant concentrate is either stored or blended with additional oil in which the polymer is to be solubilized.

In yet another procedure the hot aromatic solvent containing dissolved polymer is contacted (with agitation), first with the oil in which the polymer is to be solubilized, then alkyl phenol-type solubilizer is added. After the solution is homogenous the aromatic solvent is stripped off to give the concentrate. Again the concentrate can be further blended with oil.

In the favored practice, to the hot, stirred solution of polymer is added a neat mixture of alkyl phenol type solubilizer or an aromatic solvent solution of both the alkyl phenol-type of solubilizer and the oil in which the polymer is to be solubilized. In either case the aromatic solvent is stripped off to yield the concentrate of alkyl phenol-type solubilizer oil and polymer. Again, as previously described, the concentrate can be stored and/or blended with more oil.

The solubilizing agent is generally used in large weight excess of solubilizer to the polymeric substrate. The precise ratios are variable, dependent upon the molecular weight of polymer, the solubilizing agent used and the type of oil the complex is to be dissolved into. In general terms, where the molecular weight of the polymer substrate is between 50,000 and 5,000,000, the weight ratios are as follows:

(a) For naphthenic oils.—On a parts by weight basis the ratio of alkylated phenol solubilizer to polymeric substrate varies from 2 to 1 to 20 to 1, preferably from 5:1 to 10:1.

(b) For paraffinic oils.—On a parts by weight basis, the ratio of solubilizer to substrate varies from 2:1 to 200:1, preferably from 10:1 to 50:1.

(c) For miscellaneous oils such as raw linseed oil, poly alkylene glycols, synthetic esters and diesel fuels, weight ratios of 5:1 and higher of solubilizer to polymer are needed. Unleaded premium motor gasolines require weight ratios of 2:1 and higher.

(d) Preferred solubilizing composition.—As indicated previously, while all of the alkylated phenol-type solubilizing agents, whose alkyl groups contain a total of 4 to 50 carbon atoms, can be utilized as solubilizing agents, the favored group comprises the alkylated hydroxy mononuclear aromatics. Within this relatively narrow class of solubilizers, the preferred group comprises the monohydroxy benzenes alkylated with alkyl groups containing from 8 to 20 carbon atoms. These work most effectively on the high molecular weight poly (alkylene oxides) substrates wherein the alkylene oxide group is selected from ethylene oxide, propylene oxides, butylene oxides and their mixtures. Less favored as a class but useful are the alkali metal phenolates and even more particularly, the alkaline earth metal phenolates such as barium and calcium phenolates wherein the alkylating groups contain a total of 8 to 20 carbon atoms.

(e) Solution of solubilized poly (alkylene oxide) in oil.—After preparing the complexes of alkylated-type phenol and the polymers described in the preceding sections they may be incorporated in oil in the conventional manner for blending lubricant additives, that is, the oil-polymer cocentrate complex may be heated to 120° to 200° F. or higher by vigorous stirring for a period ranging from 15–30 minutes. Additives such as rust inhibitors, extreme pressure agents, foam inhibitors and the like may also be incorporated into the blend of the concentrate and oil at this time.

In order to disclose this invention in the greatest possible detail, the following illustrative examples are sub-

EXAMPLE 1

Solubilization of high molecular weight poly (ethylene oxide)

In this example a 1 part by weight portion of poly (ethylene oxide) having a molecular weight of about 5,000,000 is dissolved in 50 parts of benzene by heating at 160° F. with stirring. A 100 parts by weight portion of nonylphenol is added to the stirred mixture and the heating is continued at 160° F. until the benzene is evaporated. A 5 parts by weight of the resulting extremely viscous concentrate is blended with a solvent refined paraffin base oil having a viscosity of 73 cs. at 100° F. and a viscosity of 8.35 cs. at 210° F. and a viscosity index of 90. The viscosities of the blend are essentially the same as those of the paraffin oil, but the blend had a tacky texture when rubbed between the fingers. Prior to treatment of the polymer a 0.1% by weight solution of the polymer could not be prepared in the above base oil even though the mixture is heated to 200° F. with vigorous stirring.

Comparable tacky blends of the paraffin oil used supra are obtained in two separate experiments following the same procedure, components and proportions of components of Example 1, except that in one instance 100 parts by weight of diisooctylphenol is substituted for the 100 parts by weight portion of nonylphenol, while in the second run diisoamylphenol is substituted on a weight by weight basis for the nonyl phenol.

EXAMPLE 2

Solubilization of another high molecular weight poly (ethylene oxide)

A 1.0 part by weight portion of a poly (ethylene oxide) having a molecular weight of about 250,000 is treated as in Example 1 (i.e., dissolved in benzene, nonyl phenol added, evaporation of the benzene, etc.). Five parts by weight of the benzene-free resultant concentrate is blended into 95 parts by weight of paraffinic base oil A[1] producing a blend which has a viscosity at 100° F. of 71.8 cs., at 210° F. of 7.85 cs. and a viscosity index of 77. Again the oil had the same tacky texture as the blend of Example 1.

The same tacky blend is obtained when the polymer is taken up with toluene (instead of benzene) mixed with hexyl phenol and the same quantity of paraffin base oil used in Example 1.

EXAMPLE 3

Solubilization of a high molecular weight poly (ethylene oxide) using an alkylphenolate salt as solubilizing agent A 4 parts by weight portion of the polymer of Example 1 is dissolved in 500 parts of benzene and 500 parts by weight of a 50% by weight solution of additive X ($CO_2$-neutralized basic barium salt of a $C_{12}$ alkylphenolate in 50% by weight of paraffinic base oil). The benzene is evaporated off at 165° F. A 100 parts by weight portion of the concentrate is blended into 900 parts by weight of a non-solvent refined paraffin base oil[1] to give a blend having a viscosity at 100° F. of 34.2 cs., a viscosity at 210° F. 540 cs., a viscosity index of 101 and exhibiting a tacky consistency.

[1] See major characteristics of Base Oil A and other coded materials in the page following the examples.

EXAMPLE 4

Solubilization of another high molecular weight poly (ethylene oxide) using an alkylphenolate salt as solubilizing agent The procedure of Example 3 is followed using 4 parts by weight of a poly (ethyleneoxide) having a molecular weight of about 300,000 and adding 500 parts by weight of additive A to the benzene solution of polymer. After evaporating off the benzene, a 100 parts by weight portion of the concentrate is added to 900 parts Base Oil B. The blend has a viscosity at 100° F. of 31.8 cs., a viscosity at 210° F. of 4.86 cs., and a viscosity index of 72. The blend has a tacky consistency.

EXAMPLE 5

Solubilization of a high molecular weight poly (propylene oxide) using another alkylphenolate salt as solubilizing agent A 10 part by weight portion of a poly (propylene oxide) having a molecular weight of about 600,000 is dissolved in 500 parts of stirred hot benzene. To this solution is added 200 parts by weight of Additive Y and 790 parts by weight of Base Oil A. The blend of polymer, zinc phenolate, oil and benzene is stripped of benzene by heating to 165° F. to form a viscous concentrate. A mixture of 500 parts by weight of the concentrate with 500 parts by weight of Base Oil A produces a resulting blend having a kinematic viscosity at 100° F. of 140.5 cs., and at 210° F. a viscosity of 10.67 cs. and a viscosity index of 50. The blend is tacky and stringy.

EXAMPLE 6

Solubilization of a high molecular weight poly (propylene oxide) using a magnesium phenolate The procedure of Example 5 is repeated using 10 parts by weight of poly (propylene oxide) of Example 5 but 200 parts by weight of Additive Z instead of the aforementioned zinc salt. After adding the benzene, magnesium salt solubilizer and oil, the benzene is stripped off to yield a viscous concentrate which, when blended (500 parts by weight of concentrate with 500 parts by weight of Base Oil A) as in Example 5, produces a tacky and stringy blend having a viscosity of 106.6 cs. at 100° F. and 9.93 cs. at 210° F. and a viscosity index of 62. The blend was tacky and stringy.

EXAMPLE 7

Solubilization of high molecular weight poly (propylene oxide) using nonyphenol as solubilization agent A 7.5 parts by weight portion of the polymer of Example 5, 1000 parts of hot benzene, 150 parts by weight of nonyl phenol and 2840 parts by weight portion of Base Oil A are added with stirring and heated to 160° F. until the polymer dissolves. The benzene is stripped off at 165° F. The viscosity of the final blend is 121.6 cs. (at 100° F.), 9.71 cs. (at 210° C.) and the stringy and tacky blend was a viscosity index of 48.

EXAMPLE 8

Solubilization of high molecular weight poly(propylene oxide) using alkyl phenol solubilizing agent and a naphthenic oil A 30 parts by weight of poly (propylene oxide) of Example 5, 2000 parts of hot benzene, 150 parts by weight of nonylphenol and 2820 parts by weight of Base Oil C, a naphthene base mineral oil having a viscosity of 69.2 cs. (at 100° F.), 6.25 cs. (at 210° F.) and a viscosity index of less than zero are heated with stirring at 165° F. until the polymer dissolves and the benzene is stripped off, yielding a viscous concentrate. A blend of this concentrate (500 parts by weight and 500 parts by weight of Base Oil C) has a viscosity of 149.6 cs. (at 100° F.), 11.0 cs. (at 210° F.) a viscosity index of 48 and a tacky consistency.

EXAMPLE 9

Solubilization of high molecular weight poly (1,2-butylene oxide) using barium phenolate solubilizer A 20 parts by weight proportion of poly (1,2-butylene oxide) having a molecular weight of about 500,000 is dissolved in 2000 parts of benzene with stirring and 400 parts by weight of Additive X and 1580 parts by weight of Base Oil A are added to the heated, stirred mixture. The benzene is stripped off at 165° F., yielding a final tacky and stringy blend characterized as follows: viscosity 174.2 cs. (at 100° F.), 16.31 cs. (at 210° F.) and a viscosity index of 105.

Comparable tacky and stringy concentrates are obtained in the above procedure when 200 parts by weight portion of nonylphenol is substituted for the barium salt.

EXAMPLES 10 TO 14

Solubilization of diverse oils using the poly (propylene oxide) concentrate of Example 5

A 5 part by weight portion of the concentrate of Example 5 is used as an additive for 95 parts of the following diverse "oils."

| Ex. No. | Nature of "oils" | Clarity and tackiness |
|---|---|---|
| 10 | Unbodied raw linseed oil | Clear and tacky. |
| 11 | Polyalkylene glycol synthetic oil having a Saybolt viscosity at 100° F. of about 500 sec. | Do. |
| 12 | Pentaerythritol ester having a viscosity at 210° F. of 7.0 cs. | Do. |
| 13 | Diesel fuel having IBP of 350° F. and EP of 525° F. | Clear but not tacky. |
| 14 | Unleaded gasoline having an IBP of 90° F. and an EP of 360° F. | Do. |

CHARACTERIZATION OF OILS AND ADDITIVES UTILIZED IN EXAMPLES 1 TO 14

| | Base oil | | |
|---|---|---|---|
| | A | B | C |
| Type | Paraffinic—Solvent refined | Paraffin base—Not solvent refined | Naphthene base—Not solvent refined |
| Viscosity at— | | | |
| 100° F. | 73.0 | 21.2 | 69.2. |
| 210° F. | 7.35 | 3.88 | 6.25. |
| Viscosity index | 90 | 72 | Below zero. |

| | Additive | | |
|---|---|---|---|
| | X | Y | Z |
| Description. | 50% (wt.) $CO_2$ neutralized basic Ba $C_{12}$ alkyl phenolate.[1] | 50% (wt.) Zn $C_{12}$ alkyl phenolate.[1] | 50% (wt.) Mg $C_{12}$ alkyl phenolate.[1] |

[1] 50% paraffin base mineral oil.

As the numerous examples and the specification indicate, the novel invention offers several advantages both in process and compositional aspects.

Insofar as the process is concerned, this is the first known instance of where a variety of poly (alkylene oxide) polymers ranging in molecular weight from about 50,000 to 5,000,000 and higher, normally insoluble in mineral oils such as paraffinic or naphthenic oils and synthetic oils can be solubilized therein without drastically altering the nature of the molecule. Since there is little likelihood of a chemical reaction taking place in the present process, it is surprising to find that oil-soluble complexes can be formed under these very mild treatment conditions. Although hydrogen bonding is considered a possible explanation for the solubilization observed, no specific mechanism is relied on or advanced for patentability. The process is further advantageous in that it usually proceeds rapidly at relatively low temperatures using inexpensive, readily available solubilizers and produces stable oil-soluble concentrates and their blends.

In its compositional aspects the invention permits the formulation of thickened and tacky petroleum based lubricants containing heretofore unavailable high molecular weight poly (alkylene oxide) additives having applications where tackiness or minimization of lubrication loss through drainage is desirable.

As can be seen from an examination of the preceding disclosure, numerous changes, variations, modifications and the like can be made in the polymeric substrates, solubilizers, proportions, temperatures and mode of formulation without departing from the inventive concept. The metes and bounds of this invention are best determined by the claims which follow, taken in conjunction with this specification.

What is claimed is:

1. A process for preparing mineral oil soluble concentrate of poly (alkylene oxide) substrates having a molecular weight range of from about 50,000 to 5,000,000 said substrates normally being insufficiently soluble in oils to the extent that a stable and clear 0.10% by weight solution of said substrates in said oil cannot be prepared at 75° to 85° F., comprising:
   (a) admixing said substrates to be solubilized with at least a solubilizing amount of at least one aromatic solvent selected from the group consisting of benzene, alkylated mononuclear aromatic hydrocarbon solvents wherein the total number of carbon atoms in the alkylating groups range between 1 and 3, and mixtures of said aromatic solvents to form an aromatic solution of said substrates,
   (b) admixing each part by weight of said substrates in said aromatic solution with from 2 to 200 parts by weight of at least one alkylated phenol-type of solubilizer, said phenol-type solubilizer is selected from the group consisting of monohydroxy benzenes alkylated with alkyl groups containing 6 to 20 carbon atoms, to form a solution of the substrates, solubilizer and aromatic solvent,
   (c) heating the solution of substrates solubilizer and aromatic solvent until the aromatic solvent is removed and an oil-soluble concentrate of substrates is produced.

2. The process of claim 1 wherein the alkylene group of the poly (alkylene oxide) substrates contain from 2 to 4 carbon atoms and the aromatic solvent is benzene.

3. The process of claim 2 wherein each part by weight of the oil soluble concentrate is admixed with from 1 to 50 parts by weight of the oil in which the substrates is to be solubilized, said oil being selected from the group consisting of paraffinic oils, naphthenic oils and mixtures thereof.

4. The process of claim 1 wherein at least part of the oil in which the substrates are to be solubilized is added to the aromatic solution of substrates, alkylated phenol-type solubilizer, prior to the removal of aromatic solvent.

5. The concentrate of claim 1 wherein the alkylene group of the substrate contains from 2 to 4 carbon atoms.

6. A process for preparing mineral oil-soluble blends of poly (alkylene oxide) substrates having a molecular weight range of from about 50,000 to 5,000,000, said substrates normally being insufficiently soluble in mineral oils to the extent that a clear 0.10% by weight stable solution of the substrates in said oil cannot be made at 75° F. to 85° F., comprising the steps of:
   (a) admixing said substrate to be solubilized in oil with a solubilizing amount of at least one aromatic solvent selected from the group consisting of benzene, toluene, xylenes, and mixtures of these aromatic solvents to form an aromatic solution of said substrate,
   (b) admixing for each part by weight of substrate contained in said aromatic solution from 2 to 200 parts by weight of alkylated phenol-type of solubilizing agent selected from the group consisting of alkylated phenols, alkaline earth metal phenolates and zinc phenolates, wherein said alkyl groups contain 4 to 50 carbon atoms, to form a solution of polymer, solubilizing agent and aromatic solvent, (c) heating the solution to remove the aromatic solvent to form an oil soluble concentrate of substrate and alkylated phenol-type of solubilizing agent, (d) blending each part by weight of the concentrate with at least 1 part by weight of an oil selected from the group consisting of paraffinic oil, naphthenic oil, polyalkylene glycol synthetic oil, synthetic alkyl ester oils, raw linseed oil, gasoline and diesel fuel, until a blend of the poly (alkylene oxide) substrate in said oil is produced.

7. The process of claim 6 wherein at least a minor portion of the oil in which the substrate is to be solubilized is is added to the aromatic solution after dissolution of the polymer in aromatic solvent and prior to removal of the aromatic solvent.

8. A process for converting poly (alkylene oxide) substrates having a molecular weight of at least 50,000 to 5,000,000, normally insoluble in oils selected from the group consisting of mineral oils, vegetable oils, polyalkylene glycol oils, diesel fuels and unleaded gasolines, said substrates normally being insoluble in said oils to the extent that a stable and clear 0.10% by weight solution cannot be prepared at 75° to 85° F. consisting essentially of:

(a) admixing each part by weight of the substrates to be solubilized with from 2 to 200 parts by weight of alkylated phenol-type solubilizers, said solubilizers being selected from the group consisting of alkylated phenols, alkali metal phenolates, alkaline earth metal phenolates and zinc phenolates, wherein said alkylating groups present on said phenols contain 4 to 50 carbon atoms, and (b) heating said admixture of solubilizers with said substrates from about 120° F. to 200° F. until said normally oil-insoluble substrates are converted to an oil soluble form.

References Cited
UNITED STATES PATENTS

| | | | |
|---|---|---|---|
| 2,620,308 | 12/1952 | Stewart et al. | 252—52 |
| 3,296,135 | 1/1967 | Cupper et al. | 252—47.5 |
| 2,602,048 | 7/1952 | Michaels et al. | 252—32.7 |

OTHER REFERENCES

"Encyclopedia of Polymer Science & Technology," vol. 6 (1967) p. 103.

"Natural & Synthetic High Polymers," Meyer 2nd ed. vol. IV (1950) pp. 245–246.